UNITED STATES PATENT OFFICE.

C. F. BINDER, OF PHILADELPHIA, PENNSYLVANIA, ASSIGNOR TO HIMSELF AND J. BINDER.

IMPROVED LIQUID GLUE.

Specification forming part of Letters Patent No. 56,665, dated July 24, 1866.

*To all whom it may concern:*

Be it known that I, C. F. BINDER, of Philadelphia, Pennsylvania, have invented an Improved Liquid Glue; and I do hereby declare the following to be a full, clear, and exact description of the manner in which the same is made.

About eight hundred pounds of fresh bones are placed in a perforated metal kettle or crate, and the latter is lowered into a vessel filled with water. The water in the vessel is then heated by means of an external fire or by a steam-coil, and is maintained at the boiling-point for about eighteen hours, the fatty and other matters which rise to the surface of the water being removed from time to time. After the bones have been boiled for a sufficient length of time the crate is removed from the vessel, and the liquor in the latter is withdrawn and introduced into a second vessel and again heated. As soon as the liquor begins to boil about one and a half pound of lime-water is added, and the scum which rises to the surface is removed, the boiling being continued until no more scum is formed. As soon as the liquor is clear about one pound of sulphate of alumina is added, a scum and a precipitate being thus formed. The liquor is then allowed to stand for about three hours, when the scum is removed and the clear liquor is drawn off from the precipitate and introduced into a third vessel, where it is thoroughly mixed with about eight pounds of molasses or other equivalent clarifying material. Should the liquor be now sufficiently concentrated it is ready for use. If necessary, however, it may be thickened by further boiling it, maintaining it meanwhile in constant agitation.

The liquor, when the above-described operations are finished, is viscid, very adhesive, and may be used in place of ordinary prepared glue for any of the purposes to which the latter is usually applied. The glue thus prepared will, while in a mass, retain its liquid form under all circumstances, being affected neither by excessively hot or cold weather. It will not become moldy, possesses no unpleasant smell, and, as no acids or strong alkalies are used in its manufacture, it may be safely employed for cementing cloths and other fabrics to articles where the ordinary glue could not be used on account of its injurious effect on the color of the fabric.

The treatment to which the bones are submitted in nowise injures them. They may therefore be afterward used for any of the purposes to which they are ordinarily applied.

Although the liquor for preparing the glue may be obtained by treating the bones especially for the purpose, the ordinary waste liquor from bone-boiling establishments and other manufactories where bones are treated may be submitted to the above-described process with a like result.

It will be apparent that by thus utilizing what has heretofore been a waste material large quantities of superior liquid glue may be obtained at a small cost.

Although I have alluded to lime-water and sulphate of alumina as being used for preparing the glue, other substances may be employed. A solution of potassa, for instance, may be substituted for the lime-water, and plumbic ore may be used in place of the sulphate of alumina. I prefer, however, to use the materials first mentioned, as I have found them the best for the purpose.

The molasses may also be dispensed with when it is not desired to clarify the liquor.

I claim as my invention and desire to secure by Letters Patent—

A liquid glue produced in the manner and by the process substantially as herein described.

In testimony whereof I have signed my name to this specification in the presence of two subscribing witnesses.

CARL FREDRICH BINDER.

Witnesses:
CHARLES E. FOSTER,
H. HOWSON.